United States Patent Office 3,324,564
Patented June 13, 1967

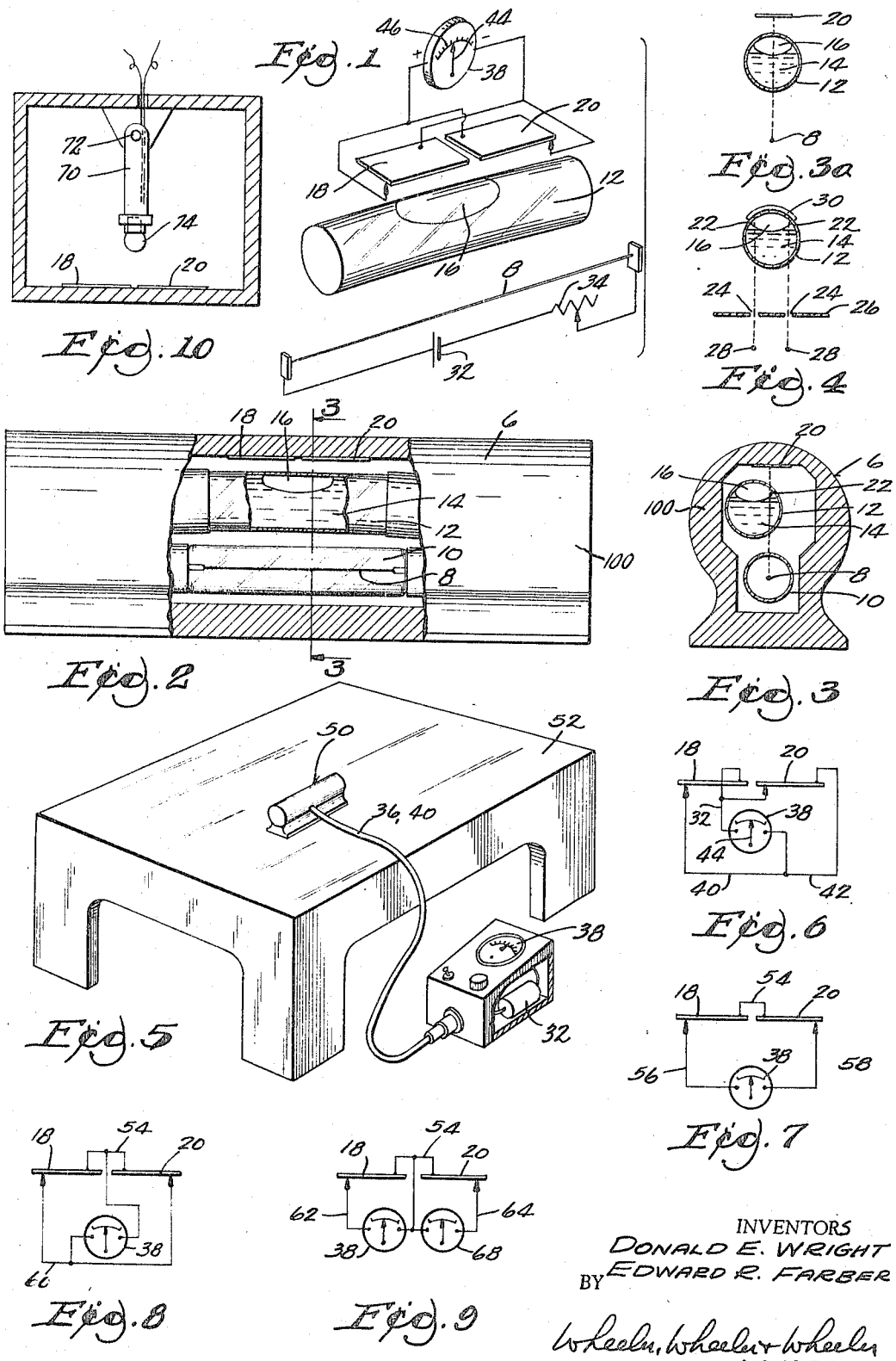

3,324,564
LEVEL WITH ELECTRICALLY RESPONSIVE INSTRUMENT
Donald E. Wright, Elm Grove, and Edward R. Farber, Delafield, Wis.; said Wright assignor to Randall J. Wright, Elm Grove, Wis., and said Farber assignor to Empire Level Mfg. Co., Milwaukee, Wis., a partnership
Filed Apr. 1, 1963, Ser. No. 269,460
5 Claims. (Cl. 33—206)

This invention relates to a level with electrically responsive instrument.

The invention has several objectives including, first, the provision of an unusually sensitive leveling device and, secondly, a preferred arrangement whereby the response is progressive and substantilly linear to indicate the extent to which the work is out of level and, thirdly, the provision of a leveling device which can be read at a remote point to indicate not only when the work is level but the direction of tilt, if any. An incidental advantage of the arrangement disclosed consists in the ease with which sensitivity may be controlled within wide limits.

The device comprises a light source, a gravitational indicator which may be any one of a number of devices such as a pendulum or, preferably a vial containing a liquid and a bubble, and a pair of photo-responsive receptors arranged along the path of movement of the bubble and connected with a meter to form a very sensitively-responsive bridge circuit. The movement of the gravitational indicator controls the relative amount of light reaching the respective photo-responsive elements. The arrangement may be such as to increase or decrease the light reaching that portion of a photo-responsive device.

For best results, the light source or sources are very much elongated either in the sense of being one or more filaments of substantial length or in the sense of comprising a slot or slots of substantial length which are formed in a mask or screen between a conventional lamp and the vial. In other words, for the purposes of this disclosure a slot may be regarded as a light source even though the light does not originate therein.

Taking the vial and bubble as an example of a gravitational indicator, it is likewise preferred that the bubble in the vial be elongated as compared with the bubble sometimes used. Both the elongation of the light source and the elongation of the bubble are preferred because the photosensitive receptors preferably employed are elongated strips of self-generating material such as the silicon or selenium solar cells. In the use of such material, the greater the length of material which is exposed to light, the greater will be output. Accordingly, our electrical bridge circuit employs a set of relatively narrow but elongated areas of solar cell material placed end to end. Ideally, the bubble can register with the area at either side of the central meter connection or it may lap both of the areas to an extent which is identical or which may vary in any degree.

In different positions of the vial, the bubble may tend to pass light to, or to focus the light upon, the respective photo-responsive receptors; or it may tend to refract or deflect the light in such a manner that the light does not reach the receptor through the interposed bubble. It is broadly immaterial to the operation of the device which arrangement is used. Provided the electrical circuit is appropriate to the selected arrangement, in either case the movement of the bubble in the vial will produce a differential reaction in the respective receptors to give a sensitive indication of the bubble position.

As an example, a spirit level vial which the industry regards as a very sensitive vial and which is sold on the basis of giving a reading which is accurate within ten seconds of arc will, if used in the instant assembly, give a reading which is accurate to within less than 1/10 of a second of arc.

In the drawings:

FIG. 1 is a diagrammatic view in perspective showing the general arrangement and electrical connections of the parts of a level embodying the invention.

FIG. 2 is a view in perspective showing a preferred embodiment of the invention with portions of the case broken away.

FIG. 3 is a detail view taken in section on the line 3—3 of FIG. 2.

FIG. 3a is a diagrammatic view showing the parts in section comparable to that of FIG. 3 but illustrating a modified embodiment in which the light source, the vial and the receptor are aligned instead of the vial being offset as in FIG. 3.

FIG. 4 is a fragmentary detail view in cross section showing various modifications.

FIG. 5 is a veiw on a greatly reduced scale showing in perspective a machine base being leveled through the use of the improved meter.

FIG. 6 is a diagram of the electrical connections between the meter and the semi-conductor strips in the preferred embodiment of FIG. 1.

FIG. 7 is a diagrammatic view comparable to FIG. 6 but showing a modified electrical hookup between the semi-conductor strips and the meter.

FIG. 8 is another diagrammatic view showing a different electrical hookup between the semi-conductor strips and the meter.

FIG. 9 is another diagrammatic view showing a modified hookup using two meters.

FIG. 10 is a diagrammatic view in side elevation of a gravitational indicator which exemplifies any number of devices which may be substituted for the vial.

Upon any appropriate frame 6 is assembled an elongated light source such as the filament 8 of lamp 10. As an example of a preferred gravitational indicator we may use a generally conventional spirit level vial 12 which contains a liquid 14 and a bubble 16 of air or other gas. By way of example and not by way of limitation, we have found it appropriate to use a two inch vial with a three-quarter inch bubble, the associated lamp filament being at least an inch and a half in length. The associated semi-conductive photosensitive receptors 18 and 20 are so disposed that when the bubble intervenes between the light source and a portion or all of the photosensitive lower face of one of the receptors, the light reaching such face is reduced to an extent commensurate to the amount of light intercepted or refracted by the side of the bubble. Again, by way of example, and not by way of limitation, the receptor cells used are about four-tenths of an inch in width and three-quarters of an inch in length.

Assuming that the instrument is to be used in an area having general illumination, ambient light is desirably excluded, as by the case 100 shown in FIG. 3, so that maximum reaction of the photo-responsive receptors will result from changes in bubble position. As the frame is tilted, the bubble moves longitudinally of vial 12 in the path of light passing from the elongated source 8 to the self-generating receptors 18 and 20. The response is substantially linear over the entire range.

It is broadly immaterial whether the presence of the bubble between the light source and the receptor increases or decreases the amount of light reaching the receptor. If the light passes centrally through the bubble as in FIG. 3a, the portion of the vial in which the bubble is located will be slightly more transparent than the portion of the vial from which the bubble is absent. In other words, the liquid 14 is less transparent than the gas of the bubble 16. Thus, the amount of light reaching the receptors is increased in the area in which the bubble displaces the liquid. The difference in transparency resulting from the presence or absence of the bubble is sufficient to give an appropriate response in the receptors 18 and 20.

However, increased response is obtained if the side edge 22 of the bubble is in the direct path of light emission from the source 8 to the receptors 18 and 20 as shown in FIG. 3. In this view, the vial 12 is offset so that it is not centered with respect to a central plane common to the filament and the receptors. In this relative position of the parts, the light from the source is refracted by the liquid-filled vial to a degree such that little light reaches the receptor except when the bubble is beneath one of the receptors, in which case a major part of the light reaches the receptor.

If desired, we may use two sources such as the narrow elongated slots 24 in the mask 2. These may be regarded as sources, for the purposes of the functioning of the device, even though they do not originate any light but merely pass light from one or more filaments 28. A separate optional arrangement disclosed in FIG. 4 consists in the application of the light responsive receptors directly to the top surface of the vial 12 as shown at 30. The vial and its liquid content will pass light from the sources 24 onto the receptor except when the side 22 of the bubble 16 intervenes.

In practice a narrow elongated light source such as filament 8 is energized by a battery 32 subject to the control of a rheostat 34. The advantage of the rheostat consists in the fact that, when this is used, it becomes possible to vary the sensitivity of the device. Sensitivity is, in general, proportional to the intiensity of the light.

A variety of electrical connections may be made between the receptors and the instrument. The arrangement that has been found to give the best results is that diagrammed in FIG. 6 and also shown in FIG. 1. In that arrangement, the upper surface of receptor 18 is connected by the lead 32 to the lower surface of the receptor 20 and to one terminal of the microammeter 38. The other terminal of the ammeter is connected by leads 40 and 42 respectively with the lower or light sensitive surface of receptor 18 and the upper surface of receptor 20. If the amount of light reaching the receptors is identical, the needle 44 of the ammeter will take a central or zero position. If one or the other of the receptors is getting the greater amount of illumination, the needle will be deflected accordingly. The amount of deflection will be proportionate to the amount of excess illumination and the direction of deflection will indicate whether the bubble has been displaced from its normal central position toward one receptor or the other. Accordingly, the operator reading the instrument at a remote point will know the direction in which it is out of level and the relative extent to which it is out of level. The device is not only extremely sensitive but also exteremely accurate. In repeated tests it will give identical readings of the needle 44 on the dial 46 of the instrument.

Because of the flexible connections 36 and 40 between the level 50 and the meter 38, it is possible for a single workman to level a heavy machine base such as that shown in FIG. 5, the level 50 being disposed on the surface 52, thereof, while the meter 38 is located within sight of a workman employed in the leveling operation beneath the base. There are many other situations in which it is important to have a remote reading of the status of a level.

While the circuit of FIG. 6 has been found to be most satisfactory, other circuit connections are operative and acceptable. The arrangement shown in FIG. 7 gives results only slightly less satisfactory than that shown in FIG. 6. In FIG. 7 the receptors 18 and 20 have their dark surfaces connected by the conductor 54. The two sides of the meter 38 are respectively connected by leads 56 and 58 to the light sensitive lower surfaces of the respective receptors. The response of the meter is fairly sensitive and direction of tilt is satisfactorily shown.

The arrangement shown in FIG. 8 gives sensitive response but does not show the direction of tilt. The lead 54 connects the upper surfaces of receptors 18 and 20, as in FIG. 7. The light responsive surfaces are connected to each other by the lead 60. The instrument 38 is connected between leads 54 and 60.

FIG. 9 duplicates the circuit of FIG. 8 except that two meters 38 and 68 are used. One side of each is connected to the lead 54. The other side of meter 36 is connected by lead 62 with the light responsive lower surface of receptor 18. The other side of meter 68 is connected by lead 64 with the lower light responsive surface of receptor 20. This has good sensitivity and does indicate the direction of tilt.

In the arrangement shown in FIG. 10, the gravitational indicator comprises a pendulum 70 pivoted at 72 and having at its free swinging end a lamp 74 which selectively varies the illumination on the receptors 18 and 20 according to the position of the pendulum. The reading instrument may be of any desired type and connected with receptors 18 and 20 in any way (as exemplified herein) to give progressive change in reading according to the displacement of the pendulum 70 from its normal centered position.

In any embodiment we may use a conventional microammeter which has electrical contacts on the needle and in the path of needle movement to close a relay circuit for closing some other electrical circuit to energize any controlled apparatus when a given needle deflection is reached. We may also eliminate the meter completely and substitute any amplifier or relay or other electrical apparatus to show visual or auditory or other response.

We claim:
1. A level comprising the combination with a gravitational indicator comprising an elongated vial containing liquid and an elongated bubble movable in the vial along a predetermined path, of a light source elongated in general parallelism with the vial, a series of photo sensitive receptors comprising strips of semi-conductor material and extending along said path at one side of the vial and opposite said light source, said strips being elongated along said path, the vial being offset laterally from a plane including the light source and the center line of said strips, whereby to locate a meniscus at the side of said bubble between the light source and a given strip area with which said bubble registers, and thereby refracts light from said source and progressively varies in accordance with bubble movement the amount of light reaching said given strip area from said source.

2. A level according to claim 1 in which the light source comprises a filament having a length approximating the total length of the series of photosensitive receptors.

3. A level according to claim 1 in which the light source includes a slot elongated parallel to said path and means for projecting radiant illumination through the slot against the vial and in the direction of said strips.

4. A level according to claim 1 which includes two strips, first electrical conductor means connecting the strips electrically in series as aforesaid second electrical conductor means connecting the said other faces of said strips, and bridge circuit conductor means connecting said meter electrically between the first and second conductor means.

5. A level according to claim 1 in which said electrical instrument is located at a point remote from said strips, and the said electrical connections are flexible between the strips and the instrument.

References Cited

UNITED STATES PATENTS

| Re. 20,823 | 8/1938 | Goodwin | 250—210 |
| 899,730 | 9/1908 | Haunty | 33—216 |
| 2,058,777 | 10/1936 | Debrie | 88—24 |
| 2,252,727 | 8/1941 | Pepper | 33—206.5 |
| 2,378,526 | 6/1945 | Agnew | 33—205 |
| 2,427,902 | 9/1947 | Clifton | 33—206.5 |
| 2,879,405 | 3/1959 | Pankove | 250—211 |
| 3,104,229 | 9/1963 | Koelmans et al. | 250—211 |

LEONARD FORMAN, *Primary Examiner.*

L. V. ANDERSON, *Assistant Examiner.*